T. H. WHELESS.
CUSHIONING VEHICLE BODY FRAMES.
APPLICATION FILED NOV. 22, 1911.
1,171,077.
Patented Feb. 8, 1916.
4 SHEETS—SHEET 1.
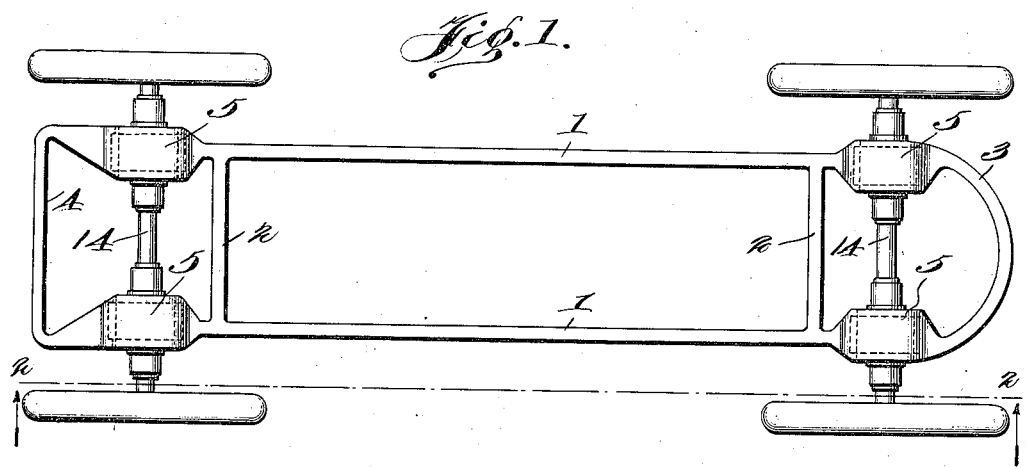
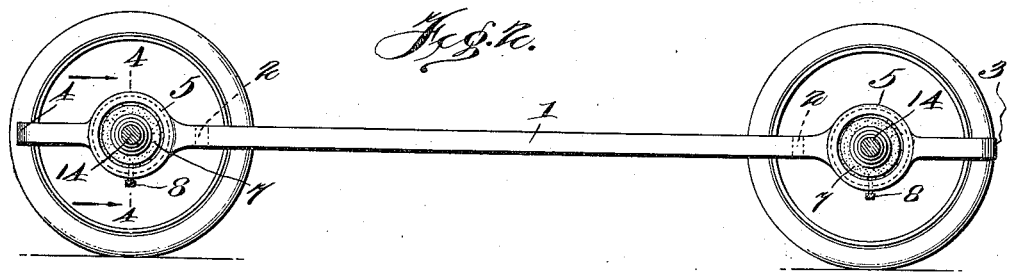
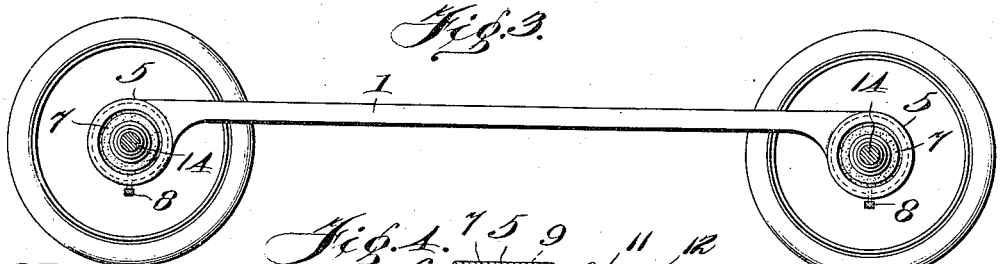
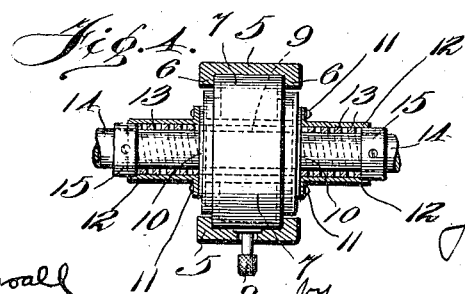

T. H. WHELESS.
CUSHIONING VEHICLE BODY FRAMES.
APPLICATION FILED NOV. 22, 1911.
1,171,077.
Patented Feb. 8, 1916.
4 SHEETS—SHEET 2.
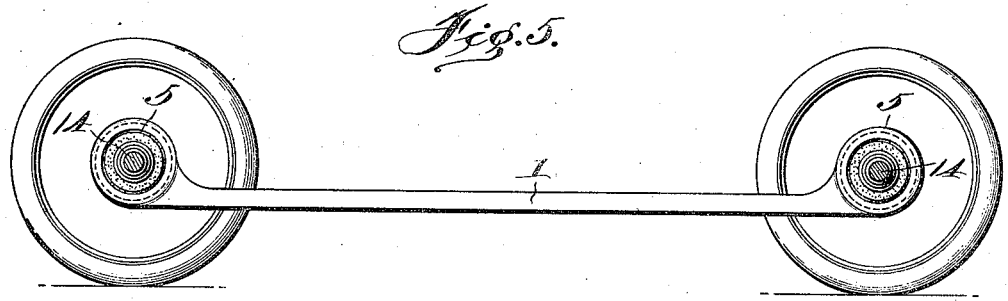
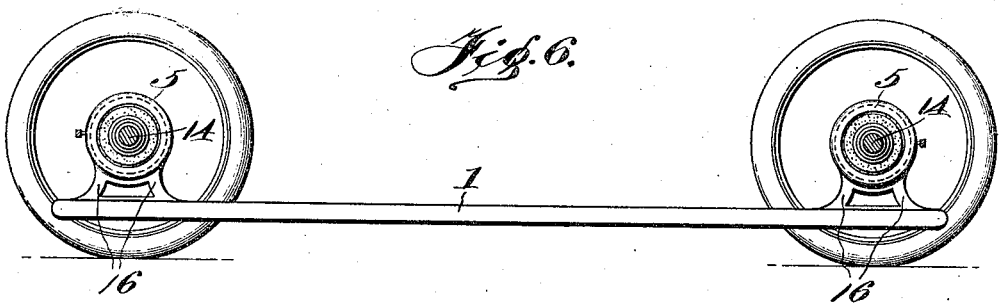
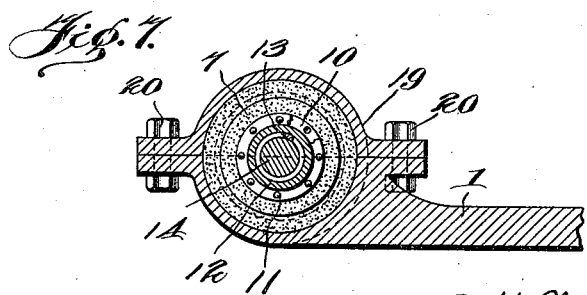

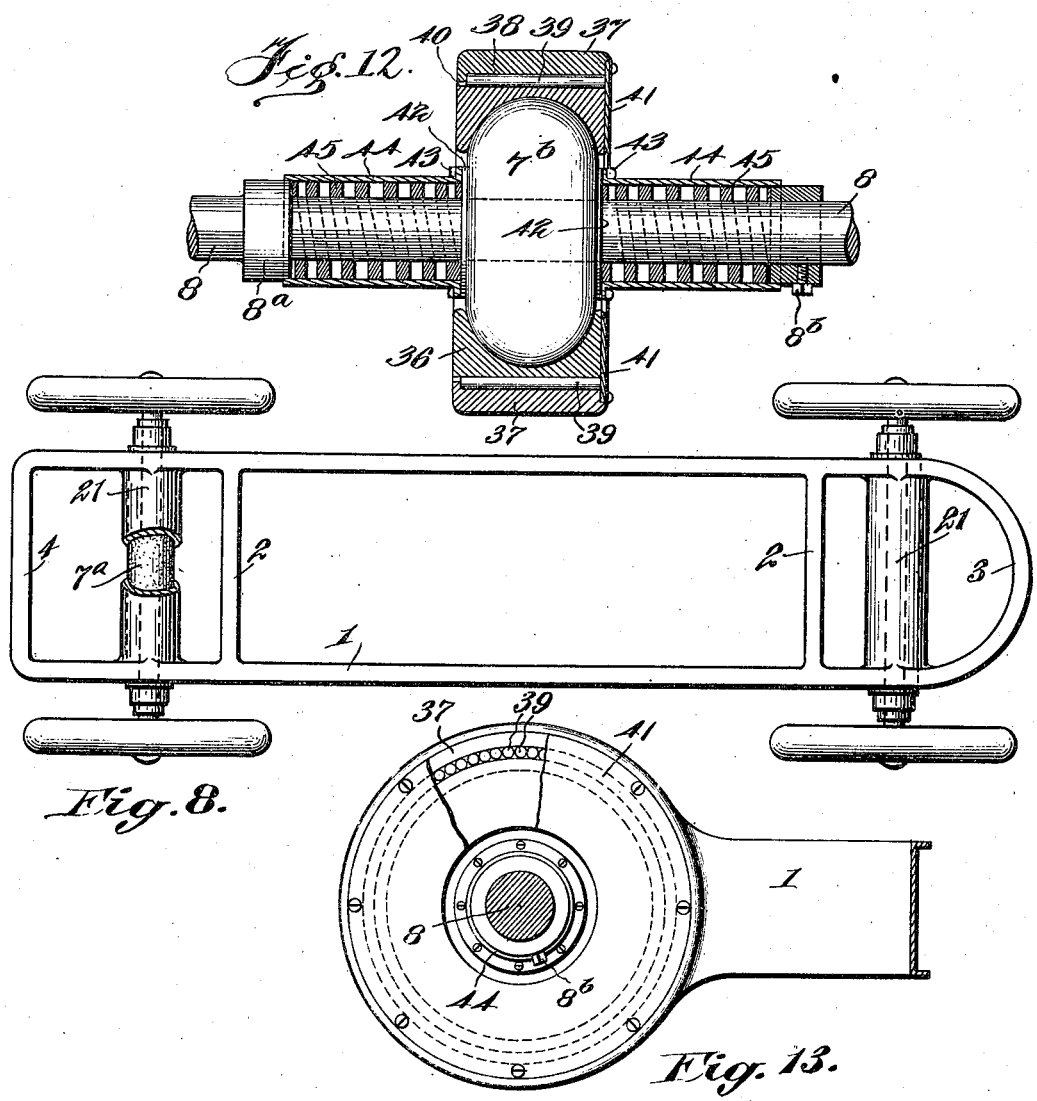

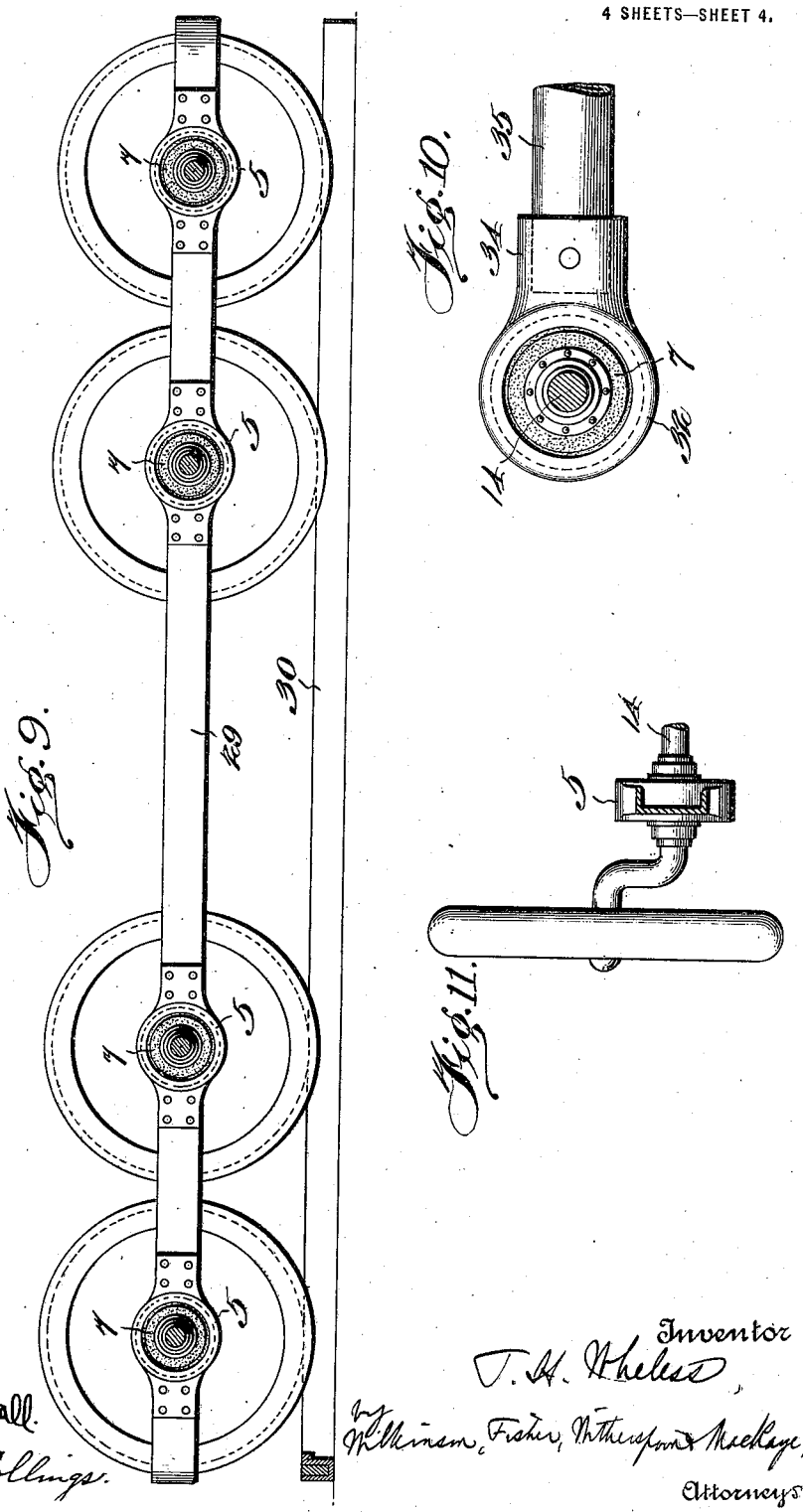

UNITED STATES PATENT OFFICE.

THOMAS HENRY WHELESS, OF NEW YORK, N. Y.

CUSHIONING VEHICLE-BODY FRAMES.

1,171,077.  Specification of Letters Patent.  Patented Feb. 8, 1916.

Application filed November 22, 1911. Serial No. 661,711.

*To all whom it may concern:*

Be it known that I, THOMAS H. WHELESS, a citizen of the United States, residing at New York city, in the county of New York and State of New York, have invented certain new and useful Improvements in Cushioning Vehicle-Body Frames; and I do hereby declare the following to be a full, clear, and exact description of the invention, such as will enable others skilled in the art to which it appertains to make and use the same.

My invention relates to improvements in means for cushioning vehicle body frames, and it is intended to provide a cheap, simple, strong, efficient, and durable device, which does away with most, if not all, of the metallic springs now in use.

The object of this invention is to provide a vehicle, the body of which is supported directly on cushions surrounding the axle of the vehicle, without the intervention of metal springs, and the invention is applicable to vehicles of all kinds.

My invention will be understood by reference to the accompanying drawings, in which the same parts are indicated by the same numerals throughout the several views.

Figure 1 is a plan view of the body frame, wheels, and axles constructed according to my invention; Fig. 2 shows a section along the line 2—2 of Fig. 1, and looking in the direction of the arrows; Fig. 3 shows a similar section to that shown in Fig. 2, except that the body frame is overhung slightly; Fig. 4 shows a section through one of the cushioning devices, as along the line 4—4 of Fig. 2, and looking in the direction of the arrows, parts being shown in elevation; Fig. 5 shows a similar structure to Fig. 3, except that the frame is underslung; Fig. 6 shows the body frame suspended by brackets from the cushioning devices; Fig. 7 shows in vertical section a modified mode of attaching the body frame to the cushioning device; Fig. 8 shows a plan view of a modified form of body frame of vehicle, with a modified form of cushioning device; Fig. 9 shows the cushioning device and body frame as applied to car wheels running on tracks; Fig. 10 shows the cushioning device and body frame as applied to a tubular construction; Fig. 11 shows the cushioning device applied to a bent axle; and Figs. 12 and 13 show in cross section and elevation another form of resilient connection between the body frame and axle.

Referring first to Figs. 1, 2, and 4, 1 represents the body frame, the side members of which are connected together in any suitable way, as by the braces 2. Contiguous to the axle, the body frame is provided with enlarged annular bearings 5, shown in section in Fig. 4. These bearings have inwardly turned flanges 6, to receive the cushion 7, which is shown as a pneumatic annular pad charged with compressed air by the valve 8; but it may be a solid rubber annular block, or it may be made of any suitable resilient material. This cushion 7 is mounted on a sleeve 9, and held between plates 10, attached to flanges 11 on the sliding sleeve 12, inclosing the springs 13, mounted on the axle 14. These springs are held between the plates 10 and the set collar 15, and there being two of said set collars and two springs, as shown in Fig. 4, lateral thrust in either direction is taken care of.

In the form of device shown in Figs. 1, 2, and 4, the axle does not rotate.

In the form of device shown in Fig. 3, the construction is generally similar to that shown in Figs. 1 and 2, except that the sides of the body frame 1 are elevated, or overhung.

In the form of device shown in Fig. 5, the arrangement is similar to that shown in Fig. 3, except that the side bars of the body frame are lowered, or underslung.

In the form of device shown in Fig. 6, the body frame 1 is connected by brackets 16 to the bearings 5.

Fig. 7 shows a solid rubber ring, mounted around the axle 14, and engaging plates 10, secured to the flanges 11 of the sleeves 12, as shown in Fig. 4; but the construction differs from that shown in said figure, in that the rubber ring is shown as of solid rubber, and not filled with compressed air.

In Fig. 7, the body frame 1 is attached to the cushioning device by means of the split bearing 19, the parts 9 of which are rigidly secured by bolts 20.

Fig. 8 shows a similar body frame to that shown in Fig. 1, except that at each end of the frame, a cylinder 21 is provided, inclosing the annular cushioning device 7$^a$, which cushioning device preferably extends the width of the body frame.

This cushioning device is preferably of solid rubber, or like resilient material.

Referring now to Fig. 9, this shows the improved cushioning device applied to a series of car axles, which car axles are connected together by the frame 29. 30 represents one of the rails on which the wheels run.

Referring now to Fig. 10, this shows an annular casing 32, inclosing the solid rubber ring 7, mounted upon the axle 14, as previously described, and this casing 32 is connected by a hollow sleeve 34 to the hollow body frame bar 35, the whole illustrating my improved cushioning device as applied to the tubular construction of vehicle body frames.

Fig. 11 shows the improved cushioning construction as shown either in Fig. 4 or Fig. 7, as applied to a downwardly bent axle.

Referring now to Fig. 12, the axle 8 is preferably provided with a boss 8$^a$ and the set collar 8$^b$. Mounted on this axle, is the cushion 7$^b$, preferably made of solid rubber, which cushion is inclosed in the housing 36, inclosed in the casing 37, which is secured to, or integral with, the body frame 1, as shown in Fig. 13. This casing 37 is preferably counterbored, as at 38, to receive the antifriction rollers 39, which are held in place at one end by the lip 40, and at the other end by the face plate 41. At each side of the cushion 7$^b$ is a plate 42, secured by the flanges 43 of the sleeves 44, which sleeves are free to slide over the boss 8$^a$ and the set collar 8$^b$. Inclosed in these sleeves 44 are springs 45, the construction being generally similar to that already described with reference to Fig. 4.

It will be noted that these springs 45 serve as shock absorbers against end thrust relative to the axle, while the resilient cushion 7$^b$ serves to take up thrust in any direction at right angles to the axis of the axle.

In the form of device shown in Figs. 12 and 13, it will be obvious that the shaft rotates, and that the friction of the cushion 7$^b$ with the housing 36 causes said housing to rotate within the roller bearings 39. It will be obvious that the axle might also be permitted to rotate, if desired.

It will be noted that in all the forms of the device hereinbefore described, the weight of the vehicle body and body frame is taken directly upon the cushioning device, without the intervention of any metallic springs; and moreover, it will be noted that the inertia of the vehicle body against jolts in any direction is also resisted by the cushioning members, without the intervention of metallic springs.

It will be noted, also, that the shocks of starting or stopping are also taken charge of by the cushioning device in the body frame itself, and without the intervention of any metallic springs, or any other cushioning device.

It will thus be seen that I present a cheap, strong, durable, and extremely efficient device to cushion the bodies and axles of vehicles against the various shocks incident to usage.

The forms of construction herein described provide vehicles that are strong, of superior riding quality, are specially adapted for bodies of the underslung type, and may be used with or without pneumatic tires on the wheels.

While I have shown the various resilient cushions applied to the axles between the wheels, it will be obvious that the same may be applied exterior to the wheels after the manner of journal boxes in railroad cars, as is well known in the art.

It will be obvious that various other modifications might be made in the herein described device, and in the mode of applying same, and in the construction, combination, and arrangement of parts, which could be used without departing from the spirit of my invention.

Having thus described my invention, what I claim and desire to secure by Letters Patent of the United States is:—

1. In a vehicle the combination with side bars for the body frame provided with a cylindrical recess, forming a housing, contained therein, of an axle projecting through said housing, and a resilient cushion mounted in said housing and inclosing said axle, substantially as described.

2. In a vehicle the combination with a body frame and axle, of a resilient cushion in said body frame and surrounding the axle, with end plates and sleeves loosely mounted on said axle, said end plates bearing against said resilient cushion, fixed bearings on said axle, and springs mounted in said sleeves and engaging said end plates and said fixed bearings, substantially as described.

3. In a vehicle the combination with a body frame and axle, of a resilient cushion in said body frame and surrounding the axle, with a sleeve interposed between said resilient cushion and said axle, with end plates and sleeves loosely mounted on said axle, said end plates bearing against said resilient cushion, fixed bearings on said axle, and springs mounted in said sleeves and engaging said end plates and said fixed bearings, substantially as described.

In testimony whereof, I affix my signature, in presence of two witnesses.

THOMAS HENRY WHELESS.

Witnesses:
    H. W. PRIMM,
    BERNARD BLATT.